US006723152B2

(12) United States Patent
Bikson et al.

(10) Patent No.: US 6,723,152 B2
(45) Date of Patent: Apr. 20, 2004

(54) GAS SEPARATION USING MEMBRANES FORMED FROM BLENDS OF PERFLUORINATED POLYMERS

(75) Inventors: Benjamin Bikson, Brookline, MA (US); Yong Ding, Norwood, MA (US); Johann Katz Leroux, Sharon, MA (US); Joyce Katz Nelson, Lexington, MA (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/187,124

(22) Filed: Jul. 1, 2002

(65) Prior Publication Data

US 2004/0003714 A1 Jan. 8, 2004

(51) Int. Cl.$^7$ ............................................ B01D 53/22
(52) U.S. Cl. ...................... 95/45; 95/54; 96/13; 96/14
(58) Field of Search ........................ 95/45–55; 96/4, 96/8, 10, 13, 14; 55/524, DIG. 5

(56) References Cited

U.S. PATENT DOCUMENTS

| | | | |
|---|---|---|---|
| 3,978,030 A | * 8/1976 | Resnick | 526/247 |
| 4,553,983 A | 11/1985 | Baker | 55/16 |
| 4,565,855 A | 1/1986 | Anderson et al. | 526/247 |
| 4,754,009 A | 6/1988 | Squire | 526/247 |
| 4,897,457 A | 1/1990 | Nakamura et al. | 526/247 |
| 4,910,276 A | 3/1990 | Nakamura et al. | 526/247 |
| 5,051,114 A | 9/1991 | Nemser et al. | 55/16 |
| 5,089,033 A | 2/1992 | Wijmans | 55/16 |
| 5,147,417 A | 9/1992 | Nemser | 55/16 |
| 5,181,940 A | 1/1993 | Bikson et al. | 55/16 |
| 5,288,304 A | * 2/1994 | Koros et al. | 95/45 |
| 5,646,223 A | 7/1997 | Navarrini et al. | 526/247 |
| 5,868,992 A | 2/1999 | Roman | 264/340 |
| 5,871,680 A | 2/1999 | Macheras et al. | 264/211.14 |
| 5,917,137 A | * 6/1999 | Ekiner | 96/10 |
| 5,922,791 A | * 7/1999 | Ekiner | 524/104 |
| 5,985,002 A | 11/1999 | Grantham | 95/47 |
| 6,293,996 B1 | 9/2001 | Grantham et al. | 95/47 |
| 6,316,684 B1 | 11/2001 | Pinnau et al. | 585/818 |
| 6,361,582 B1 | 3/2002 | Pinnau et al. | 95/45 |
| 6,361,583 B1 | 3/2002 | Pinnau et al. | 95/45 |
| 6,406,517 B1 | 6/2002 | Avery et al. | 95/45 |
| 2002/0038602 A1 | 4/2002 | Nelaon et al. | 95/45 |
| 2003/0128956 A1 | 7/2003 | Sharma et al. | 385/145 |

FOREIGN PATENT DOCUMENTS

| | | |
|---|---|---|
| EP | 0969025 A1 | 1/2000 |
| EP | 1057521 A1 | 12/2000 |
| EP | 1163949 A2 | 12/2001 |

OTHER PUBLICATIONS

A. Yu, Alentiev, et al., "High transport parameters and free volume of perfluorodioxole copolymers", Journal of Membrane Science, vol. 126, pp. 123–132, (1996).

V. Arcella, et al., "A study on a perfluoropolymer purification and its application to membrane formation", Journal of Membrane Science, vol. 163, pp. 203–209 (1999).

V.P. Shantarovich, et al., "Position Annihilation Lifetime Study of High and Low Free Volume Glassy Polymers: Effects of Free Volume Sizes on the Permeability and Permselectivity", Macromolecules 2000, vol. 33, pp. 7453–7466 (2000).

Ingo Pinnau, et al., "Gas and vapor transport properties of amorphous perfluorinated copolymer membranes based on 2,2–bistrifluoromethyl–4,5–difluoro–1,3–dioxole/tetrafluoroethylene", Journal of Membrane Science, vol. 109, pp. 125–133, (1996).

T.C. Merkel, et al., "Gas Sorption, Diffusion, and Permeation in Poly(2,2–bis(trifluoromethyl)–4,5–difluoro–1,3–dioxole–co–tetrafluoroethylene" Macromolecules 1999, vol. 32, pp. 8427–8440 (1999).

H.B. Hopfenberg, et al., "Polymer Blends", vol. 1, D.R.Paul and S. Newman, Eds. Academic Press, New York, 1978, Chapter 10.

J.A. Barrie, et al., "Gas Transport in Heterogeneous Polymer Blends", Journal of Membrane Science, vol. 13, p. 197–204(1983).

R.J. Li, et al., "Transport of Gases in Miscible Polymer Blends Above and Below the Glass Transition Region", AIChE Journal, vol. 39, p. 1509–1518(1993).

S. Senitma, "Generalized Equation for the Permeability of Heterogenous Polymer Materials", Macromolecular Chemistry and Physics, vol. 202, p. 1737–1742(2001).

I. Cabasso, Hollow–Fiber Membranes:, Kirk Othmer Encyclopedia Chem. Tech., vol. 12, p. 492–517(1980).

* cited by examiner

*Primary Examiner*—Robert H. Spitzer
(74) *Attorney, Agent, or Firm*—David M. Rosenblum

(57) ABSTRACT

A preferred gas separation membrane made from a blend of a copolymer of 2,2-bis(trifluoromethyl)-4,5-difluoro-1,3-dioxole (BDD) and tetrafluoroethylene (TFE) with a 2,2,4-trifluoro-5-trifluoromethoxy-1,3-dioxide based polymer is disclosed, the membrane exhibiting an advantageous combination of gas separation and permeation properties for a number of gas separation applications. In particular, the membrane formed from the blend of these polymers exhibits unexpectedly high gas separation factors for separation of volatile organic hydrocarbon vapors (VOC) from air, compared to the component polymers that form the blends. Fabrication of composite membranes formed from perfluoropolymer blends is further disclosed.

36 Claims, No Drawings

GAS SEPARATION USING MEMBRANES FORMED FROM BLENDS OF PERFLUORINATED POLYMERS

FIELD OF INVENTION

The instant invention relates to gas separation membranes and to a process utilizing such membranes. The membranes of the present invention are prepared from blends of perfluorinated polymers. The polymer blend membranes exhibit improved gas separation properties compared to component polymers forming the blend.

BACKGROUND OF THE INVENTION

A number of perfluorinated polymers have been disclosed in the art as membrane materials for gas separation applications. U.S. Pat. Nos. 4,897,457 and 4,910,276, disclose the use of perfluorinated polymers having repeat units of perfluorinated cyclic ethers, and report gas transport properties for a number of such polymers. U.S. Pat. No. 5,051,114 issued to S. M. Nemser and I. C. Roman, discloses a gas separation processes employing 2,2-bis(trifluoromethyl)-4,5-difluoro-1,3-dioxole (BDD) based polymer membranes. European Patent application 1,163,949A2 discloses the preparation of improved composite gas separation membranes from soluble perfluoropolymers, such as BDD and tetrafluoroethylene (TFE) copolymers, and 2,2,4-trifluoro-5-trifluoromethoxy-1,3-dioxide (TTD) and tetrafluoroethylene (TFE) copolymers. These polymers are commercially available under the tradenames Teflon® AF and Hyflon®.

U.S. Pat. No. 6,406,517 to D. L. Avery and P. V. Shanbhag discloses preparation of permeable membranes from a perfluoropolymer wherein the gas separation selectivity can be increased by blending the perfluoropolymer with a non-polymeric fluorinated adjuvant. Preferred non-polymeric adjuvants have molecular weights below about 10,000 g/mole, and specifically cited adjuvants have molecular weights of 650 and 1200–2400 g/mole.

U.S. Pat. No. 6,361,582, to I. Pinnau et al., discloses the use of perfluorinated polymers with fractional free volume below 0.3 for certain hydrocarbon separation applications.

V. Arcella et al. in an article entitled "Study on a perfluoropolymer purification and its application to membrane formation", Journal of Membrane Science, Vol. 163, pages 203–209 (1999) reported the use of copolymers of 2,2,4-trifluoro-5-trifluoromethoxy-1,3-dioxide (TTD) and tetrafluoroethylene (TFE), Hyflon® AD60X and Hyflon® AD80X, as membrane forming materials.

European Patent Applications 969,025, to P. Maccone, et al., and 1,057,521, to V. Arcella et al., disclose the preparation of non-porous and porous membranes prepared from amorphous perfluorinated polymers.

Membrane processes for separation of hydrocarbon vapors from air and other gas mixtures containing hydrocarbon vapor, are known in the art. U.S. Pat. No. 4,553,983 discloses a membrane process for recovering and concentrating organic vapors, including hydrocarbon vapors, from a feed stream of air. The process utilizes a membrane that comprises a microporous support membrane coated with a thin layer of silicone rubber. The organic vapor which has been preferentially concentrated through the membrane is further compressed and condensed to recover the vapor as a liquid.

U.S. Pat. No. 5,089,033 describes a two-step process employing a similar type of membrane for separating hydrocarbons from air, specific mention being made of petroleum product vapors. In both of these processes, the hydrocarbon vapor passes preferentially through the membrane from the high pressure side to the low pressure side, thereby removing the vapor from the air feed stream.

Another approach to the removal of hydrocarbons from air, is to utilize a membrane that preferentially permeates oxygen and nitrogen, while the hydrocarbons remain in the retentate stream. U.S. Pat. Nos. 5,985,002 and 6,293,996 report the application of such a membrane system to the recovery of hydrocarbon fuel vapors. Air containing hydrocarbon vapors is fed from a fuel storage tank to a membrane and the filtered air is withdrawn as a permeate while the hydrocarbon-enriched residue stream is returned to the fuel storage tank. The fluoropolymer membranes of U.S. Pat. No. 5,051,114 cited above can be used to separate hydrocarbons from an air stream, and this membrane system has been incorporated into U.S. Pat. Nos. 5,985,002 and 6,293,996 by reference.

U.S. Pat. No. 6,316,684, to I. Pinnau and Z. He, discloses improved membranes for hydrocarbon vapor separations, including perfluorinated polymers that contain dispersed fine non-porous particles, such as silica or carbon black particles, having an average diameter not greater than about 1,000 Å. It is generally accepted that membrane materials with a high gas selectivity have a relatively low permeation rate or productivity, and vice versa. Thus a trade-off typically exists between the selectivity and the permeability of polymeric materials, and it is an objective of membrane material development to maximize both the separation efficiency or selectivity of a membrane and its productivity.

SUMMARY OF THE INVENTION

The present invention provides for improved gas separation membranes that are fabricated from blends of two or more perfluorinated polymers, such as BDD) based polymers blended with TTD based polymers. The membranes exhibit superior gas separation properties, and are extremely useful in gas separation processes where the feed gas streams contain $H_2$, $N_2O_2$, $CH_4$, CO, $CO_2$, $C_3H_8$ or higher molecular weight hydrocarbon vapors, by virtue of the high permeability and selectivity exhibited by membranes made from these blends. The present invention also provides for methods to fabricate such blend membranes.

DETAILED DESCRIPTION OF THE INVENTION

The inventors have found, unexpectedly, that the blends of a first copolymer, preferably 2,2-bis(trifluoromethyl)4,5-difluoro-1,3-dioxole (BDD) and tetrafluoroethylene (TFE), with a second copolymer selected from a number of soluble perfluorinated polymers, such as copolymers of 2,2,4-trifluoro-5-trifluoromethoxy-1,3-dioxole with tetrafluoroethylene, exhibit superior combinations of gas separation and permeation properties. Such blends are extremely useful for gas separation applications, such as the generation of oxygen and nitrogen enriched air, natural gas sweetening, and in particular for separation of volatile organic compounds (VOC) from air and other gases.

Polymer blends can be divided into miscible, homogeneous blends and heterogeneous blends. Miscible homogeneous blends are often referred to as polymer alloys. A typical example of polymer alloy is the blends of poly (phenylene oxide), PPO, and polystyrene, PS. Most polymer blends, however, are heterogeneous with one polymer phase dispersed in another polymer phase.

The gas permeability coefficient, P, when plotted semi-logarithmically versus the blend composition in terms of volume fraction, Φ, often shows a linear relationship when the blends are miscible, as discussed by H. B. Hopfenberg, and D. R. Paul, in "Polymer Blends", Volume 1, D. R. Paul and S. Newman, Eds., Academic Press, New York, 1978, Chapter 10. On the other hand, a number of theoretical models, including the Maxwell model, have been used to predict permeation properties of heterogeneous polymer blends. These models can be found in the following articles: J. A. Barrie and J. B. Ismail, "Gas transport in heterogeneous polymer blends", Journal of Membrane Science, Vol.13, pages 197–204 (1983); R. J. Li, et al. "Transport of gases in miscible polymer blends above and below the glass transition region", AIChE Journal, Vol. 39, pages 1509–1518 (1993); A. Senuma, "Generalized equation for the permeability of heterogeneous polymer materials", Macromolecular Chemistry and Physics, Vol. 202, pages 1737–1742 (2001). Despite some differences, these models predict that the gas transport properties of a blend will fall between the gas transport properties of the component polymers that form the blend.

Surprisingly, the blends of BDD based polymers with other soluble perfluorinated polymers, such as TTD based polymers, exhibited gas transport properties that neither can be predicted by the existing models nor can be anticipated from the existing art. The gas transport properties of membranes formed from such blends, both in a flat sheet form and in a composite hollow fiber membrane form, are superior to the gas transport properties of each component polymer for a number of gas separation applications. For example, a polymer blend comprising 80% by weight of a BDD based polymer, e.g. Teflon® AF 1600, and 20% by weight or TTD based polymer, e.g. Hyflon® AD60X, exhibits a separation factor of 31.5 for nitrogen/propane separation at 30° C., while Teflon® AF1600 exhibits a separation factor of 21.4, and Hyflon® AD60X exhibits a separation factor of 27.3 for nitrogen/propane separation.

The mechanism that leads to the unexpected behavior is not completely understood and the inventors do not wish to be bound by the specific mechanism. However, it is assumed that the blends are miscible alloys and the synergistic effect of blending may be potentially attributed to the strong polymer-polymer interaction between the perfluorinated polymers. The preferred 2,2-bis(trifluoromethyl)-4,5-difluoro-1,3-dioxole BDD based polymers are random copolymers of BDD and TFE. The preparation of such copolymers is described in U.S. Pat. No. 4,754,009 to E. N. Squire and U.S. Pat No. 5,646,223 to W. Navarrini, et al. These copolymers typically contain 30–95 mole percent of the BDD component. Preferable copolymers are available commercially from DuPont under the trade name Teflon® AF and contain 50–90 mole percent of the BDD component. However, other BDD based compositions and copolymers can be employed. The TFE and BDD repeat units are:

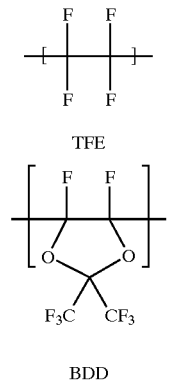

TFE

BDD

The preferred soluble perfluorinated polymers that form blends with BDD based polymers are selected from polymers or copolymers of 2,2,4-trifluoro-5-trifluoromethoxy-1,3-dioxole (TTD) and polymers prepared from highly fluorinated alkyl ether monomers, especially those polymerizable into cyclic ether repeat units with five or six member ring structures. It is also noted that the blend could also comprise two different BDD based copolymers, or two or more BDD copolymers plus the preferred soluble perfluorinated polymers noted above.

The structure of copolymers of TTD and TFE is as follows:

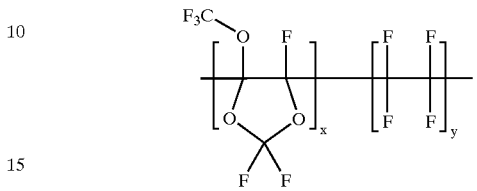

where x and y represent the relative proportions of the dioxole and the tetrafluoroethylene blocks, such that x+y=1. The preferred copolymers have a TTD/TFE ratio of 60/40 (commercially available from Ausimont as Hyflon® AD 60X) and a TTD/TFE ratio of 80/20 (commercially available from Ausimont as Hyflon® AD 80X), or a mixture of these copolymers.

Alternative preferred soluble perfluorinated polymers that form blends with BDD based polymers, are polymers prepared from highly fluorinated alkyl ether monomers, especially those polymerizable into polymers containing cyclic ether repeat units with five or six members in the ring. The most preferred material of this type has the structure:

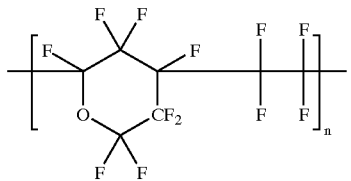

where n is a positive integer. These polymers are available commercially from Asahi Glass Company under the trade name of Cytop®.

The blends of the present invention contain 1 to 98% by weight of a BDD/TFE copolymer. Preferably the blends contain from 20 to 95% by weight of BDD/TFE copolymer Teflon® AF, and most preferably contain from 40 to 80% by weight of BDD/TFE copolymer Teflon® AF. The proportion of BDD and TFE units in the BDD/TFE copolymer may vary (as discussed above), and a blend of BDD/TFE copolymers each with different proportions of BDD and TFE units can also be utilized. Preferred BDD/TFE copolymers are Teflon® AF1600 or Teflon® AF2400 manufactured by DuPont. The compositions of the present invention comprise blends of the Teflon® AF series polymers with at least one additional soluble perfluorinated polymer. In some embodiments, two or more soluble perfluorinated polymers may be employed.

The blends of this invention typically exhibit a single glass transition temperature of an alloy, rather than two glass transition temperatures corresponding to that of each of the component polymers, which is typical of a heterogeneous blend. For example, a single glass transition temperature of 124° C. was measured for 50/50 (by weight) blend of Teflon® AF1600 polymer with Hyflon® AD60X polymer. The glass transition temperature of each of the Teflon® AF1600 and the Hyflon® AD60X was measured as 162° C. and 104° C., respectively.

The polymer blends of this invention are formed by dissolving the individual blend components in a common solvent, and then evaporating the solvent to form the blend of solid polymers. Perfluorinated and quasi-perfluorinated solvents are preferred solvents to form these solutions. Suitable solvents include, but are not limited to, perfluoro (alkylamines), commercially available as Fluorinert™ FC-40 from 3M, perfluorotetrahydrofurans, commercially available as Fluorinert™ FC-75 from 3M, and perfluoropolyethers, commercially available as Galden® HT90, Galden® HT110 and Galden® HT-135 from Ausimont.

The membranes of the present invention are preferably fabricated into a composite membrane configuration, comprised of a perfluorinated polymer blend layer superimposed onto a porous support, such that the perfluorinated polymer blend provides the desired gas separation properties and the porous substrate provides the mechanical support.

The porous substrate can be formed from organic or inorganic materials. Specific examples of suitable materials which can be employed to prepare the substrate include polysulfone, polyethersulfone, polyetherimide, polyvinylidenedifluoride, polyacrylonitrile, polyimides, polytetrafluoroethylene, polyphenylene oxide, polyolefins, such as polyethylene and polypropylene, and cellulose and its derivatives, such as cellulose acetates and ethylcellulose. Combinations of polymers including polymer blends, copolymers, terpolymers and others can also be used. Preferably, the porous substrate is fabricated from an engineering polymeric material having a glass transition temperature above 90° C. More preferably, the porous substrate is fabricated from an engineering polymeric material having a glass transition temperature above 150° C.

The porous support can be in a flat sheet or in a hollow fiber configuration. Suitable techniques for preparing the porous hollow fiber substrates include wet spinning, dry spinning, dry-wet spinning, and other methods known in the art. Techniques useful in preparing porous substrates are described, for example, by I. Cabasso in "Hollow Fiber Membranes", *Kirk Othmer Encyclopedia Chem. Tech.*, Vol. 12, pages 492–517 (1980). Preferably, the substrate is prepared by a dry-wet spinning process such as disclosed in U.S. Pat. Nos. 5,181,940 and 5,871,680.

Substrates with a high level of surface porosity are preferred. In one embodiment the ratio of the area occupied by surface pores to the total surface area is greater than $1 \times 10^{-2}$. Substrates with surface pore diameter below 500 Å and a narrow surface pore size distribution are further preferred.

The formation of composite perfluorinated polymer blend membranes can be carried out by any method known in the art, such as dip coating. Preferably, the composite membranes are prepared by a dip-coating method as disclosed in European Parent Application 1,163,949. A thin coating of the perfluorinated polymer blend layer is preferred. Generally, the coating layer is less than about 1 $\mu$m thick, preferably less than about 0.5 $\mu$m thick. Coatings chat have a thickness between about 150 angstrom (Å, wherein $1 \text{Å}=1 \times 10^{-10}$ m) and about 1000 angstroms are preferred. Particularly preferred are coatings that have a thickness of about 500 angstroms and below.

The membranes and processes of the present invention are useful for numerous gas separation applications. Specific examples include, but are not limited to, separation of oxygen from air; separation of nitrogen, oxygen, air, argon, or hydrogen from organic hydrocarbon vapors; separation of methane from propane or higher molecular weight hydrocarbons; separation of carbon dioxide from hydrocarbons; separation of light olefins from other organic vapors; and separation of isomers from one another. Organic hydrocarbon vapors include low boiling organic compounds, such as $C_{3+}$ hydrocarbons, ketones, alcohols, and the like.

The following examples will serve to illustrate the utility of this invention but should not be construed as limiting. The gas transport properties of the flat sheet blend membranes were determined by the following procedure. The membrane was sandwiched between two aluminum foils exposing a circular membrane area of 2.54 cm in diameter. The membrane was placed into a permeation cell and the perimeter of the foil was sealed with epoxy resin. The downstream side of the cell was evacuated up to $2 \times 10^{-2}$ mmHg and the feed gas introduced from the upstream side. The pressure of the permeate gas on the downstream side was measured using a MKS-Baratron pressure transducer. The permeability coefficient P was calculated from the steady-state gas permeation rate according to the equation:

$$P = C \times V \times L \times dp/dt \times 1/h$$

C=constant

V=volume of collection receiver

L=thickness of film h=upstream pressure p=downstream pressure dp/dt=slope of steady-state line (rate of downstream pressure increase)

The permeability coefficient P is reported in Barrer units (1 Barrer=$10^{10}$ cm$^3$ (STP) cm/cm$^2$ cmHg sec).

The gas transport properties of the composite membranes were measured at 25° C. by constructing small membrane modules with membrane area of about 100 cm$^2$. The gas permeation rates were determined utilizing pure gases.

COMPARATIVE EXAMPLE 1

A flat sheet film of Teflon® AF 1600 was obtained by casting a solution of Teflon® AF 1600 polymer (Du Pont) in Fluorinert™-75 solvent (3% by weight) on a clean glass plate. The solvent was evaporated under dry nitrogen. The film was released from the plate and dried under vacuum at 100° C. for 7 days. Gas transport properties of the film are listed in Tables 1 and 2.

EXAMPLES 2–5

Preparation of Blends of Teflon® AF 1600 with Hyflon® AD60X.

Flat sheet films from blends of Teflon® AF 1600 with Hyflon® AD60X were obtained by casting solutions containing predetermined amounts of Teflon® AF 1600 (Du Pont) and Hyflon® AD60X (Ausimont) in Fluorinert™-FC75 solvent (concentration ca. 3% by weight). The films were dried under vacuum at 100° C for 7 days. The blend compositions and the measured gas transport properties of these blend films are listed in Tables 1 and 2.

COMPARATIVE EXAMPLE 6

A flat sheet film of Hyflon® AD60X was prepared by a procedure similar to that described in Example 1 except Hyflon® AD60X (Ausimont) was used instead of Teflon® AF. Gas transport properties of this film are listed in Tables 1 and 2.

TABLE 1

Gas transport properties of Teflon ® AF1600, Hyflon ® AD60X and their blends.*

| Example | AF1600 (w %) | AD60X (w %) | P(He) | P($O_2$) | P($N_2$) | P($C_3H_8$) | P($CH_4$) |
|---|---|---|---|---|---|---|---|
| 1 | 100 | 0 | 1131 | 217 | 79 | 3.7 | 41 |
| 2 | 80 | 20 | 1013 | 179 | 63 | 2.0 | 31 |
| 3 | 60 | 40 | 696 | 112 | 39 | 1.3 | 19 |
| 4 | 40 | 60 | 591 | 88 | 30 | 0.83 | 14 |
| 5 | 20 | 80 | 480 | 61 | 20 | 0.42 | 8.6 |
| 6 | 0 | 100 | 441 | 56 | 18 | 0.66 | 8.2 |

*Permeability coefficients were measured at 30° C. and are reported in Barrers.

TABLE 2

Ideal gas separation factors for Teflon ® AF 1600, Hyflon ® AD60X and their blends

| Example No | AF1600 (w %) | AD60X | P($O_2$)/P($N_2$) | P($N_2$)/P($C_3H_8$) |
|---|---|---|---|---|
| 1 | 100 | 0 | 2.7 | 21.4 |
| 2 | 80 | 20 | 28 | 31.5 |
| 3 | 60 | 40 | 2.9 | 30.0 |
| 4 | 40 | 60 | 2.9 | 36.1 |
| 5 | 20 | 80 | 3.1 | 47.6 |
| 6 | 0 | 100 | 3.1 | 27.3 |

COMPARATIVE EXAMPLE 7

A flat sheet film of Teflon® AF 2400 was obtained by casting a solution of Teflon® AF 2400 polymer (Du Pont) in Fluorinert™-75 solvent (3% by weight) on a clean glass plate. After evaporating the solvent, the film was released from the plate and dried under vacuum at 100° C. for 7 days. Gas transport properties of the film are listed in Tables 3 and 4.

EXAMPLE 8

Preparation of Blends of Teflon® AF 2400 with Hyflon® AD60X.

Flat sheet films from blends of Teflon® AF 2400 with Hyflon® AD60X were obtained by casting solutions containing predetermined amounts of Teflon® AF 2400 (Du Pont) and Hyflon® AD60X (Ausimont) in Fluorinert™-75 solvent (concentration ca. 3% by weight). The films were dried under vacuum at 100° C. for 7 days. The blend compositions and gas transport properties of these blend films are listed in Tables 3 and 4.

TABLE 3

Gas transport properties of Teflon ® AF2400 and its blend with Hyflon ® AD60X.*

| Example No | AF2400 (w %) | P(He) | P($O_2$) | P($N_2$) | P($C_3H_8$) | P($CH_4$) | P($CO_2$) |
|---|---|---|---|---|---|---|---|
| 7 | 100 | 2516 | 842 | 397 | 44.1 | 276 | 2103 |
| 8 | 80 | 2072 | 496 | 199 | 14.9 | 116 | 1150 |

*Permeability coefficients were measured at 30° C. and are reported in Barrers.

TABLE 4

Ideal gas separation factors for Teflon ® AF 2400, and its blend with Hyflon ® AD60X

| Example No | AF1600 (w %) | P($O_2$)/P($N_2$) | P($N_2$)/P($C_3H_8$) | P($CO_2$)/P($CH_4$) |
|---|---|---|---|---|
| 7 | 100 | 2.1 | 9.0 | 7.6 |
| 8 | 80 | 2.5 | 13.4 | 9.9 |

COMPARATIVE EXAMPLE 9

Preparation of Teflon® AF 1600 Composite Membrane

The composite membrane of Teflon® AF 1600 was fabricated with a solution of Teflon® AF 1600 polymer (Du Pont) in Fluorinert™-75 solvent. The polymer concentration in the coating solution was 0.75 g/100 cc. Water-saturated polyethersulfone hollow fibers were partially pre-dried by passing them through a drying oven maintained at 160° C. The pre-dried polyethersulfone hollow fibers were coated by passing the fibers through a coating solution, followed by drying in a second drying oven and then collecting the coated fibers on a winder.

The thus prepared composite hollow fibers were constructed into separation modules and tested for gas permeation performance at 25° C. with pure gases. The feed pressure of the gas was around 2.3 bar, except for propane which was 1.6 bar. The pressure normalized flux and gas separation factors are listed in Table 5.

EXAMPLES 10–12

Preparation of Composite Membranes from Blends of Perfluoropolymers

Composite membranes were prepared by coating porous polyether sulfone hollow fibers with a solution of a blend of Teflon® AF 1600 polymer and Hyflon® AP60X polymers in Fluorinert™-75 solvent. The total polymer concentration in the coating solution was 0.75 g/100 cc. The weight fractions of Teflon® AP 1600 polymer and Hyflon® AD60X polymers used are listed in Table 5.

The water saturated porous polyethersulfone hollow fibers were partially pre-dried by passing through a drying oven maintained at 160° C. The partially pre-dried polyether sulfone hollow fibers were coated by transporting the fibers through a coating solution, followed by drying in a second drying oven and then collecting the coated hollow fibers on a winder.

The composite hollow fibers were constructed into separation modules and tested for gas permeation performances with pure gases at 25° C. The feed pressures of the gases were around 2.3 bar, except for the propane which was 1.6 bar. The pressure normalized flux and gas separation factors are listed in Table 5.

COMPARATIVE EXAMPLE 13

Preparation of Hyflon® AD60X Composite Membrane

The composite membrane of Hyflon® AD60X was fabricated by a procedure similar to that of Example 9, except that a coating solution containing only Hyflon® AD60X in the Fluorinert™-75 solvent was used. The pure gas permeation properties of this composite membrane are listed in Table 5.

TABLE 5

| Example No | Weight Fraction of AF1600 | Weight Fraction of AD60X | Pure gas pressure normalized Flux (GPU) | | | Selectivity | |
|---|---|---|---|---|---|---|---|
| | | | $O_2$ | $N_2$ | $C_3H_8$ | $\alpha(O_2/N_2)$ | $\alpha(N_2/C_3H_8)$ |
| 9 | 100 | 0 | 1235 | 547 | 46 | 2.3 | 12.1 |
| 10 | 75 | 25 | 983 | 437 | 21 | 2.3 | 21.1 |
| 11 | 50 | 50 | 762 | 288 | 13 | 2.6 | 22.6 |
| 12 | 25 | 75 | 518 | 215 | 29 | 2.4 | 7.4 |
| 13 | 0 | 100 | 666 | 503 | 360 | 1.3 | 1.4 |

*1 GPU = 1 × 10$^{-6}$ cm$^3$ (STP)/cm$^2$ · sec · cm Hg.

The term "(comprising" is used herein as meaning "including but not limited to", that is, as specifying the presence of stated features, integers, steps or components as referred to in the claims, but not precluding the presence or addition of one or more other features, integers, steps, components, or groups thereof Specific features of the invention are illustrated lathe specification for convenience only, as each feature may be combined with other features in accordance with the invention. Alternative embodiments will be recognized by those skilled in the art and are intended to be included within the scope of the claims.

We claim:

1. A process for separating a fast gas from a gaseous mixture that includes a fast gas component, said process comprising the steps of a) bringing said gaseous mixture into contact with a feed side of a gas separation membrane, b) providing a partial pressure differential between the feed side of the membrane and a permeate side of the membrane, such that a portion of said gaseous mixture permeates through the membrane, c) collecting a portion of said gaseous mixture as permeate gas wherein said permeate gas is enriched in said fast gas component, and d) collecting a portion of said gaseous mixture as a non-permeate gas wherein said non-permeate gas is depleted in said fast gas component, and wherein said gas separation membrane has a selective layer comprised of a blend of a copolymer of 2,2-bis (trifluoromethyl)-4,5-difluoro-1,3-dioxole based polymer with a soluble perfluorinated polymer selected from the group consisting of perfluoromethoxydioxole based polymers and perfluorocyclic ether based polymers.

2. The process of claim 1 wherein said 2,2-bis (trifluoromethyl)-4,5-difluoro-1,3-dioxole based polymer is a random copolymer with tetrafluoroethylene, wherein the 2,2-bis(trifluoromethyl)-4,5-difluoro-1,3-dioxole content is in the range of 50 to 90 mole percent.

3. The process of claim 1 wherein said 2,2-bis (trifluoromethyl)-4,5-difluoro-1,3-dioxole based polymer is a mixture of copolymers, each of the component copolymers of the mixture having a different ratio of 2,2-bis (trifluoromethyl )-4,5-difluoro-1,3-dioxole to tetrafluoroethylene.

4. The process of claim 1 wherein said blend comprises 20 to 95% by weight of the copolymer of 2,2-bis (trifluoromethyl)-4,5-difluoro-1,3-dioxole and tetrafluoroethylene.

5. The process of claim 1 wherein said blend comprises 40 to 80% by weight of the copolymer of 2,2-bis (trifluoromethyl)-4,5-difluoro-1,3-dioxole and tetrafluoroethylene.

6. The process of claim 1 wherein said perfluoromethoxydioxole based polymer has the formula:

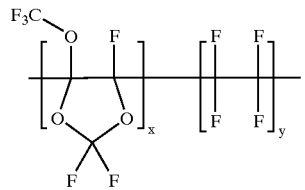

where x and y represent the relative proportions of the dioxole and tetrafluoroethylene blocks such that x+y=1.

7. The process of claim 6 wherein said perfluoromethoxydioxole based polymer is one or more copolymers each having a different ratio of 2,2,4-trifluoro-5-trifluoromethoxy-1,3-dioxide to tetrafluoroethylene.

8. The process of claim 6 wherein said perfluoromethoxydioxole based polymer is a copolymer selected from the group of copolymers having a 60/40 ratio and a 80/20 ratio of 2,2,4-trifluoro-5-trifluoromethoxy-1,3-dioxide to tetrafluoroethylene.

9. The process of claim 1 wherein said perfluorocyclic ether based polymer has the formula:

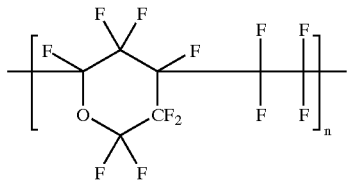

where n is an integer.

10. The process of claim 1 wherein said gaseous mixture contains a gas chosen from hydrogen, helium, nitrogen, oxygen, argon, carbon dioxide or volatile hydrocarbon vapor.

11. The process of claim 1 wherein said gas separation membrane is a composite membrane.

12. The process of claim 1 wherein said gaseous mixture is air containing volatile organic hydrocarbons.

13. The process of claim 1 wherein said gaseous mixture is air and said fast component is oxygen.

14. The process of claim 1 wherein said gaseous mixture contains hydrogen.

15. The process of claim 1 wherein said gaseous mixture contains carbon dioxide.

16. The process of claim 1 wherein said gaseous mixture contains methane.

17. The process of claim 1 wherein said gaseous mixture contains hydrocarbons with three or more carbon atoms.

18. A composite membrane comprising a porous support and a separation layer superimposed thereon wherein said separation layer is formed from a blend of a copolymer of 2,2-bis(trifluoromethyl)-4,5-difluoro-1,3-dioxole and tetrafluoroethylene with a soluble perfluorinated polymer selected from the group consisting of perfluoromethoxydioxole based polymers and perfluorocyclic ether based polymers.

19. The membrane of claim 18 wherein said copolymer of 2,2-bis(trifluoromethyl)-4,5-difluoro-1,3-dioxole and tetrafluoroethylene is a random copolymer with 2,2-bis (trifluoromethyl)-4,5-difluoro-1,3-dioxole content in the range of 30 to 90 mole percent.

20. The membrane of claim 18 wherein said copolymer of 2,2-bis(trifluoromethyl)-4,5-difluoro-1,3-dioxole and tetrafluoroethylene contains 50–90 mole percent of the of 2,2-bis(trifluoromethyl)-4,5-difluoro-1,3-dioxole component.

21. The membrane of claim 18 wherein said perfluoromethoxydioxole based polymer has the formula:

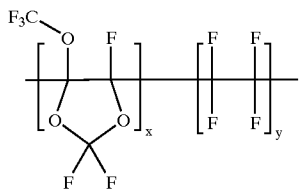

where x and y represent the relative proportions of the dioxole and tetrafluoroethylene blocks such that x+y=1.

22. The membrane of claim 21 wherein said perfluoromethoxydioxole based polymer is a copolymer having a 2,2,4-trifluoro-5-trifluoromethoxy-1,3-dioxole/tetrafluoroethylene ratio of either 60/40 or 80/20.

23. The membrane of claim 18 wherein said perfluorocyclic ether based polymer has the formula:

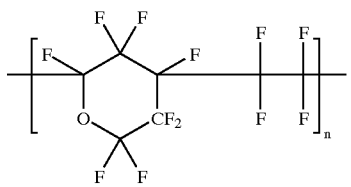

where n is an integer.

24. The membrane of claim 18 wherein said porous support is made from polysulfone.

25. The membrane of claim 18 wherein said porous support is made from polyether sulfone.

26. The membrane of claim 18 wherein said porous support is made from polyetherimide.

27. The membrane of claim 18 wherein said porous support is made from polypropylene.

28. The membrane of claim 18 wherein said porous support is made of poly(vinylidene fluoride).

29. The membrane of claim 18 wherein said porous support is made of polytetrafluoro ethylene.

30. A composition comprising a blend of a copolymer of 2,2-bis(trifluoromethyl)-4,5-difluoro-1,3-dioxole and tetrafluoroethylene with a soluble perfluorinated polymer selected from the group consisting of perfluoromethoxydioxole based polymers and perfluorocyclic ether based polymers.

31. The composition of claim 30 wherein said copolymer of 2,2-bis(trifluoromethyl)-4,5-difluoro-1,3-dioxole and tetrafluoroethylene is a random copolymer with 2,2-bis(trifluoromethyl)-4,5-difluoro-1,3-dioxole content in the range of 30 to 90 mole percent.

32. The composition of claim 30 wherein said copolymer of 2,2-bis(trifluoromethyl)-4,5-difluoro-1,3-dioxole and tetrafluoroethylene contains 50–90 mole percent of the of 2,2-bis(trifluoromethyl)-4,5-difluoro-1,3-dioxole component.

33. The composition of claim 30 wherein said perfluoromethoxydioxole based polymer has the formula:

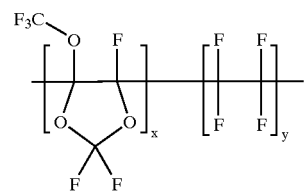

where x and y represent the relative proportions of the dioxole and tetrafluoroethylene blocks such that x+y=1.

34. The composition of claim 30 wherein said perfluorocyclic ether based polymer has the formula:

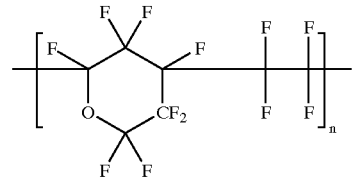

where n is an integer.

35. The composition of claim 30 wherein said blend comprises 20 to 95% by weight of the copolymer of 2,2-bis(trifluoromethyl)-4,5-difluoro-1,3-dioxole and tetrafluoroethylene.

36. The composition of claim 35 wherein said blend comprises 40 to 80% by weight of the copolymer of 2,2-bis(trifluoromethyl)-4,5-difluoro-1,3-dioxole and tetrafluoroethylene.

* * * * *